(12) United States Patent
Sun

(10) Patent No.: US 9,319,226 B2
(45) Date of Patent: Apr. 19, 2016

(54) METHOD AND SYSTEM FOR DOWNLOADING IN UBIQUITOUS NETWORK BY MEANS OF MULTICAST

(75) Inventor: Aifang Sun, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 107 days.

(21) Appl. No.: 14/352,109

(22) PCT Filed: Feb. 20, 2012

(86) PCT No.: PCT/CN2012/071376
§ 371 (c)(1),
(2), (4) Date: Apr. 16, 2014

(87) PCT Pub. No.: WO2013/075415
PCT Pub. Date: May 30, 2013

(65) Prior Publication Data
US 2014/0258391 A1    Sep. 11, 2014

(30) Foreign Application Priority Data
Nov. 23, 2011   (CN) .......................... 2011 1 0375645

(51) Int. Cl.
*G06F 15/16*   (2006.01)
*H04L 12/18*   (2006.01)
(Continued)

(52) U.S. Cl.
CPC .............. *H04L 12/18* (2013.01); *H04L 12/189* (2013.01); *H04L 65/1093* (2013.01); *H04L 67/2842* (2013.01); *H04W 4/06* (2013.01); *H04W 4/18* (2013.01)

(58) Field of Classification Search
CPC ........................... H04L 67/2842; H04L 12/18
USPC ...................................................... 709/232
See application file for complete search history.

(56) References Cited

U.S. PATENT DOCUMENTS 7,385,978 B1    6/2008   Yang
2003/0231629 A1* 12/2003 Banerjee ............. H04L 12/1859
                                              370/390
(Continued)

FOREIGN PATENT DOCUMENTS

CN    1581985 A    2/2005
CN    101022344 A   8/2007
(Continued)

OTHER PUBLICATIONS

International Search Report in international application No. PCT/CN2012/071376, mailed on Aug. 30, 2012.
(Continued)

*Primary Examiner* — Larry Donaghue
*Assistant Examiner* — James Conaway
(74) *Attorney, Agent, or Firm* — Brundidge & Stanger, P.C.

(57) ABSTRACT

A method and system for downloading in a ubiquitous network by means of multicast are disclosed. The method includes: after requesting to download a media service, a terminal acquires, from a tracing server, an address of a cache server corresponding to the media service, and requests the cache server to transmit the media service; after receiving the request, the cache server triggers a context server to determine, according to a preset multicast terminal threshold value, whether a condition for triggering multicast is met; when the condition for triggering multicast is met, the cache server cooperates with the context server and a joint radio resource management server to determine a plurality of terminals participating in multicast and a multicast channel; and the cache server sending data of the media service to each terminal on the multicast channel via a resource control node. According to the solution provided by the disclosure, a user is able to obtain a media multicast service in the case of being unable to learn the surrounding multicast group situation, which not only can make the best of the radio resources, but also can implement rapid media download for the user.

14 Claims, 3 Drawing Sheets

(51) Int. Cl.
  *H04L 29/06* (2006.01)
  *H04W 4/06* (2009.01)
  *H04L 29/08* (2006.01)
  *H04W 4/18* (2009.01)

(56) References Cited

U.S. PATENT DOCUMENTS

| | | | | |
|---|---|---|---|---|
| 2005/0281208 | A1* | 12/2005 | Dorenbosch | H04L 12/189 370/270 |
| 2006/0159090 | A1 | 7/2006 | Chang | |
| 2007/0082690 | A1* | 4/2007 | Fabien | H04W 72/005 455/518 |
| 2007/0086441 | A1* | 4/2007 | Kall | H04W 72/005 370/352 |
| 2007/0168555 | A1* | 7/2007 | Dorenbosch | H04L 12/189 709/245 |
| 2007/0208737 | A1 | 9/2007 | Li | |
| 2008/0155088 | A1 | 6/2008 | Chang | |
| 2008/0181161 | A1* | 7/2008 | Gi Kim | H04W 72/005 370/312 |
| 2008/0219227 | A1* | 9/2008 | Michaelis | H04L 12/189 370/338 |
| 2008/0305739 | A1* | 12/2008 | Huang | H04L 12/189 455/3.06 |
| 2010/0142516 | A1* | 6/2010 | Lawson | H04M 7/0021 370/352 |
| 2011/0047252 | A1* | 2/2011 | Kwapniewski | H04L 29/12066 709/220 |
| 2011/0134808 | A1 | 6/2011 | Thyni | |
| 2011/0200043 | A1* | 8/2011 | Huang | H04L 12/1886 370/390 |
| 2012/0135732 | A1* | 5/2012 | Magadi Rangaiah | H04W 48/20 455/434 |

FOREIGN PATENT DOCUMENTS

| | | |
|---|---|---|
| CN | 101262315 A | 9/2008 |
| CN | 101854288 A | 10/2010 |
| CN | 101895468 A | 11/2010 |
| CN | 101022344 B | 2/2011 |
| CN | 201846360 U | 5/2011 |
| EP | 2378771 A2 | 10/2011 |

OTHER PUBLICATIONS

English Translation of the Written Opinion of the International Search Authority in international application No. PCT/CN2009/072629, mailed on Aug. 30, 2012.

International Search Report issued in corresponding application No. PCT/CN2012/071376 on Aug. 30, 2012.

International Publication issued in corresponding application No. PCT/CN2012/071376 on May 30, 2013.

Supplementary European Search Report in European application No. 12852379.2, mailed on Feb. 5, 2015.

* cited by examiner

METHOD AND SYSTEM FOR DOWNLOADING IN UBIQUITOUS NETWORK BY MEANS OF MULTICAST

TECHNICAL FIELD

The disclosure relates to multicast technology in a ubiquitous network coordination environment in which multiple heterogeneous networks are converged, and more particularly to a method and system for downloading in a ubiquitous network by means of multicast.

BACKGROUND

According to the formulation of the present ubiquitous network-related standards and researches in the industry, it is universally acknowledged that the whole ubiquitous network coordination architecture is divided into a perception extension layer, a network/service layer and an application layer. There are many kinds of terminals in the perception extension layer and the application layer, and these terminal devices may be generally divided into two types. One type of terminal devices is a terminal group managed by a gateway in a unified manner, in which devices are intercommunicated through various protocols including a Universal Plug and Play (UPNP) protocol and access to a network through the gateway. The other type of terminal devices is a terminal group, which consists of intelligent terminals including user Personal Computers (PCs) and smart phones and may be accessed to a network directly.

For the terminal group consisting of intelligent terminals including user PCs and smart phones, if some terminals request to download the same media service, service requests of terminal users requesting for downloading may be accomplished by means of multicast rapidly and conveniently. Most conventional Internet Protocol (IP) multicast modes are applied to real-time service scenarios, such as multipoint conference, media broadcast and condition monitoring. If a new member joins in a service transmission process, the new member must have learned conditions of the multicast group and related members thereof and is incapable of acquiring service flows that have been transmitted previously. In a ubiquitous network coordination environment, the conventional IP multicast modes cannot be applied due to the heterogeneity of networks and terminals. The major problem lies in that a user cannot acquire a media multicast service in the case of being unable to learn the surrounding multicast group situation. In addition, for a terminal device joined during a multicast process, the user cannot acquire, by way of compensation, a service flow transmitted previously and fails to acquire more network capacity by using the characteristic of multiple modes and multiple interfaces of the terminal.

SUMMARY

In view of this, the disclosure is intended to provide a method and system for downloading in a ubiquitous network by means of multicast, so as to enable a user to acquire a media multicast service in the case of being unable to learn the surrounding multicast group situation. In addition, further, for a terminal device joined during a multicast process, the user can acquire, by way of compensation, a service flow transmitted previously, and may acquire more network capacity by using the characteristic of multiple modes and multiple interfaces of the terminal.

To this end, the technical solutions of the disclosure are implemented as follows.

The disclosure provides a method for downloading in a ubiquitous network by means of multicast, which includes:

after requesting to download a media service, a terminal acquires from a tracing server an address of a cache server corresponding to the media service, and the terminal requests the cache server to transmit the media service;

after receiving the request, the cache server triggers a context server to determine, according to a preset multicast terminal threshold value, whether a condition for triggering multicast is met;

when the condition for triggering multicast is met, the cache server cooperates with the context server and a joint radio resource management server to determine a plurality of terminals participating in multicast and a multicast channel; and the cache server sends the data of the media service to each terminal on the multicast channel via a resource control node.

Wherein, after the data of the media service are sent to each terminal, the method may further include:

when the data of the media service received by the terminal are incomplete, the terminal acquires data compensation from the cache server or another terminal which has received the multicast media service.

Wherein, the terminal may include a single-mode terminal and/or a multi-mode terminal; and when the terminal is a multi-mode terminal, the process that the terminal acquires the data compensation from the cache server or another terminal which has received the multicast media service when the data of the media service received by the terminal are incomplete may include:

after the multicast media service is started or the multicast media service is ended, the terminal acquires, by using a plurality of network modes supported by the terminal, the data compensation from the cache server or another terminal which has received the multicast media service.

Wherein, the process that the terminal acquires from the tracing server the address of the cache server corresponding to the media service and requests the cache server to transmit the media service after requesting to download a media service may include:

the terminal sends, to the tracing server, a request for downloading the media service;

after receiving the request, the tracing server identifies, from the request, a service type of the media service requested to be downloaded and a signalling for downloading the media service, and performs, according to the service type, an internal query for the address of the cache server corresponding to the media service in a preset service engine, and returns the address of the cache server to the terminal requesting to download the media service; and the terminal sends in a wireless communication a request for transmitting the media service, to the cache server according to the address of the cache server.

Wherein, the triggering a context server to determine, according to a preset multicast terminal threshold value, whether a condition for triggering multicast is met may include:

after receiving the request, the cache server sends a signalling for inquiring a multicast condition to the context server; and determines, according to working conditions of surrounding terminals of the terminal returned by the context server and the preset multicast terminal threshold value, whether the condition for triggering multicast is met, wherein the preset multicast terminal threshold value may include: a preset index comprehensively evaluated according to the number of terminals participating in multicast, multicast service transmission progress and quality of the multicast channel.

Wherein, the process that the cache server cooperates with the context server and the joint radio resource management server to determine the plurality of terminals participating in multicast and a multicast channel when the condition for triggering multicast is met may include:

when the condition for triggering multicast is met, the cache server determines, according to the multicast terminal threshold value, the plurality of terminals participating in multicast in surrounding terminals of the terminal, acquires, from the context server, network context information of the plurality of terminals participating in multicast; and the joint radio resource management server determines the multicast channel according to the network context information sent from the cache server, and sends the multicast channel to the cache server, wherein the network context information may include: resource control node information corresponding to the plurality of terminals participating in multicast, network load conditions and network signal strength.

The disclosure further provides a system for downloading in a ubiquitous network by means of multicast. The system includes: a terminal, a tracing server, a cache server, a context server, a joint radio resource management server and a resource control node, wherein the terminal is configured to: after requesting to download a media service, acquire, from the tracing server, an address of the cache server corresponding to the media service, and request the cache server to transmit the media service; and the cache server is configured to: after receiving the request, trigger the context server to determine, according to a preset multicast terminal threshold value, whether a condition for triggering multicast is met; when the condition for triggering multicast is met, cooperate with the context server and the joint radio resource management server to determine a plurality of terminals participating in multicast and a multicast channel; and send data of the media service to each terminal on the multicast channel via the resource control node.

Wherein, the terminal may be further configured to, when the data of the media service received by the terminal are incomplete, acquire data compensation from the cache server or another terminal which has received the multicast media service.

Wherein, the terminal may include a single-mode terminal and/or a multi-mode terminal; and when the terminal is the multi-mode terminal, the process that the terminal acquires data compensation from the cache server or another terminal which has received the multicast media service when the data of the media service received by the terminal are incomplete may include:

after the multicast media service is started or the multicast media service is ended, the terminal acquires, using multiple network modes supported by the terminal, the data compensation from the cache server or another terminal which has received the multicast media service.

Wherein, the process that a terminal acquires from a tracing server an address of a cache server corresponding to the media service and requests the cache server to transmit the media service after requesting to download a media service may include:

the terminal sends, to the tracing server, a request for downloading the media service;

after receiving the request, the tracing server identifies, from the request, a service type of the media service requested to be downloaded and a signalling for downloading the media service, and performs, according to the service type, an internal query for the address of the cache server corresponding to the media service in a preset service engine, and returns the address of the cache server to the terminal requesting to download the media service; and the terminal sends in a wireless communication a request for transmitting the media service, to the cache server according to the address of the cache server.

Wherein, the triggering a context server to determine, according to a preset multicast terminal threshold value, whether a condition for triggering multicast is met may include:

after receiving the request, the cache server sends a signalling for inquiring a multicast condition to the context server, and determines, according to working conditions of surrounding terminals of the terminal returned by the context server and the preset multicast terminal threshold value, whether the condition for triggering multicast is met, wherein the preset multicast terminal threshold value may include: a preset index evaluated according to the number of terminals participating in multicast, multicast service transmission progress and quality of the multicast channel.

Wherein, the process that the cache server cooperates with the context server and a joint radio resource management server to determine a plurality of terminals participating in multicast and a multicast channel when the condition for triggering multicast is met may include:

when the condition for triggering multicast is met, the cache server determines, according to the multicast terminal threshold value, the plurality of terminals participating in multicast from surrounding terminals of the terminal, acquires, from the context server, network context information of the plurality of terminals participating in multicast; and the joint radio resource management server determines the multicast channel according to the network context information sent from the cache server, and sends the multicast channel to the cache server, wherein the network context information may include: resource control node information corresponding to the plurality of terminals participating in multicast, network load conditions and network signal strength.

According to the method and system for downloading in a ubiquitous network by means of multicast of the disclosure, after requesting to download a media service, a terminal acquires, from a tracing server, an address of a cache server corresponding to the media service, and requests he cache server to transmit the media service; after receiving the request, the cache server triggers a context server to determine, according to a preset multicast terminal threshold value, whether a condition for triggering multicast is met; when the condition for triggering multicast is met, the cache server cooperates with the context server and a joint radio resource management server to determine a plurality of terminals participating in multicast and a multicast channel; the cache server sends data of the media service to each terminal on the multicast channel via a resource control node. By means of the disclosure, a user is able to obtain a media multicast service in the case of being unable to learn the surrounding multicast group situation, which not only can make the best of the radio resources, but also can implement rapid media download for the user. Moreover, point-to-point compensation can be implemented for packet loss and video loss parts, thus ensuring the quality of downloaded media data.

DETAILED DESCRIPTION

The basic idea of the disclosure is that: after requesting to download a media service, a terminal acquires, from a tracing server, an address of a cache server corresponding to the media service, and requests the cache server to transmit the media service; after receiving the request, the cache server triggers a context server to determine, according to a preset multicast terminal threshold value, whether a condition for triggering multicast is met; when the condition for triggering multicast is met, the cache server cooperates with the context server and a joint radio resource management server to determine a plurality of terminals participating in multicast and a multicast channel; and the cache server sending data of the media service to each terminal on the multicast channel via a resource control node.

The technical solutions of the disclosure will be further elaborated below in combination with the accompanying drawings and specific embodiments.

Figure 1:
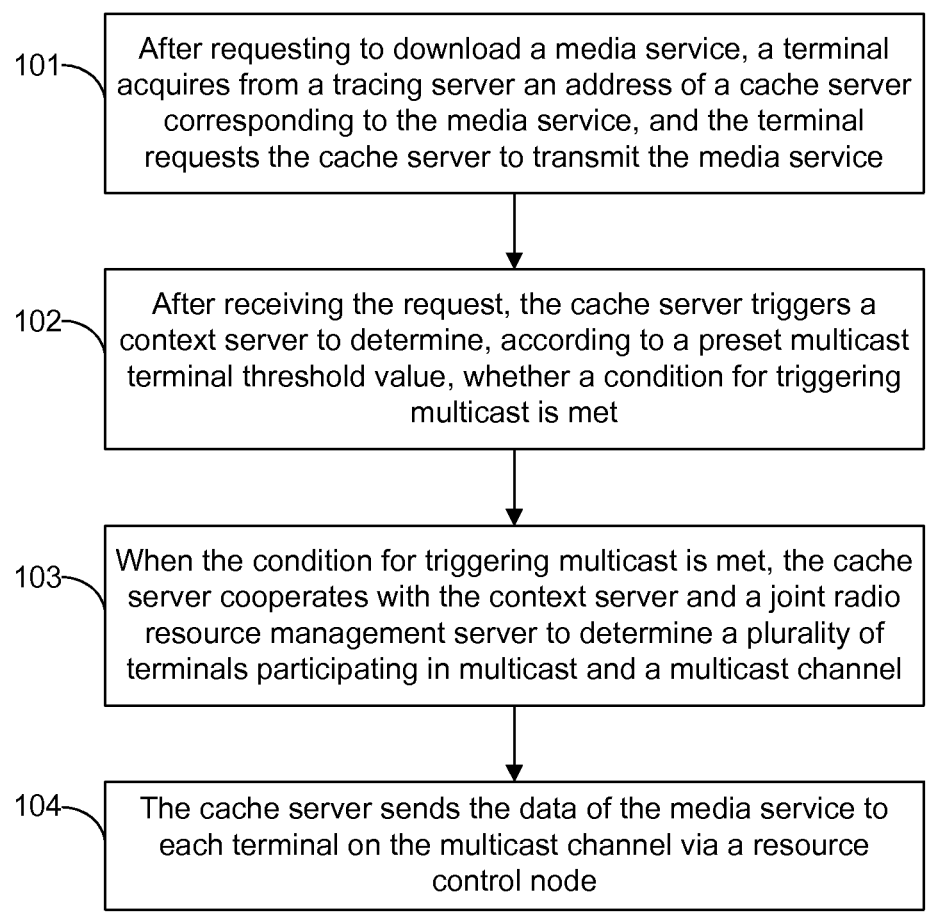
FIG. 1 is a flowchart of a method for downloading in a ubiquitous network by means of multicast according to the disclosure.

FIG. 1 is a flowchart of a method for downloading in a ubiquitous network by means of multicast according to the disclosure. As shown in FIG. 1, the method includes:

Step 101: After requesting to download a media service, a terminal acquires from a tracing server an address of a cache server corresponding to the media service, and the terminal requests the cache server to transmit the media service.

Specifically, the process that the terminal acquires from the tracing server the address of the cache server corresponding to the media service after requesting to download the media service includes: the terminal sends, to the tracing server, a request for downloading the media service; and after receiving the request, the tracing server identifies, from the request, a service type of the media service requested to be downloaded and a signalling for downloading the media service, and performs, according to the service type, an internal query for the address of the cache server corresponding to the media service in a preset service engine, and returns the address of the cache server to the terminal requesting to download the media service. The process that the terminal requests the cache server to transmit the media service includes: the terminal sends in a wireless communication a request for transmitting the media service, to the cache server according to the address of the cache server.

Step 102: After receiving the request, the cache server triggers a context server to determine, according to a preset multicast terminal threshold value, whether a condition for triggering multicast is met.

Specifically, the process of triggering the context server to determine, according to a preset multicast terminal threshold value, whether the condition for triggering multicast is met includes: after receiving the request, the cache server sends a signalling for inquiring a multicast condition to the context server, and then determines, according to working conditions of surrounding terminals of the terminal returned by the context server and the preset multicast terminal threshold value, whether the condition for triggering multicast is met. The preset multicast terminal threshold value includes: a preset index comprehensively evaluated according to the number of terminals participating in multicast, multicast service transmission progress and quality of the multicast channel;

Step 103: When the condition for triggering multicast is met, the cache server cooperates with the context server and a joint radio resource management server to determine a plurality of terminals participating in multicast and a multicast channel.

Specifically, the process that when the condition for triggering multicast is met, the cache server cooperates with the context server and the joint radio resource management server to determine the plurality of terminals and the multicast channel includes: when the condition for triggering multicast is met, the cache server determines, according to the multicast terminal threshold value, the plurality of terminals participating in multicast from surrounding terminals of the terminal, acquires, from the context server, network context information of the plurality of terminals participating in multicast; and the joint radio resource management server determines the multicast channel according to the network context information sent from the cache server, and sends the multicast channel to the cache server. Wherein, the network context information includes: resource control node information corresponding to the plurality of terminals participating in multicast, network load conditions and network signal strength.

Step 104: The cache server sends the data of the media service to each terminal on the multicast channel via a resource control node.

Further, after Step 104, the method further includes: when the data of the media service received by the terminal are incomplete, the terminal acquires data compensation from the cache server or another terminal which has received the multicast media service.

Specifically, the terminal includes a single-mode terminal and/or a multi-mode terminal. When the terminal is the multi-mode terminal, the process that the terminal acquires the data compensation from the cache server or another terminal which has received the multicast media service when the data of the media service received by the terminal are incomplete includes: after the multicast media service is started or the multicast media service is ended, the terminal acquires, by using multiple network modes supported by the terminal, the data compensation from the cache server or another terminal which has received the multicast media service. Further, for example, after the multicast service is started, the terminal initiates, according to acquired breakpoint information of the media service, the request to the tracing server through another network mode occupied by a non-multicast service. The tracing server cooperates with the context server, the joint radio resource management server and the cache server to send media service data earlier than the breakpoint information to the terminal, and combines the media service data earlier than the breakpoint information with media service data later than the breakpoint information to achieve data compensation. Alternatively, after the multicast service is ended, the terminal checks service integrity, reports lost media service data to the cache server, and the cache server inquires, by using the context server, a surrounding terminal capable of providing the lost media service data, so that the terminal acquires the data compensation through multiple network modes supported by the terminal.

Figure 2:
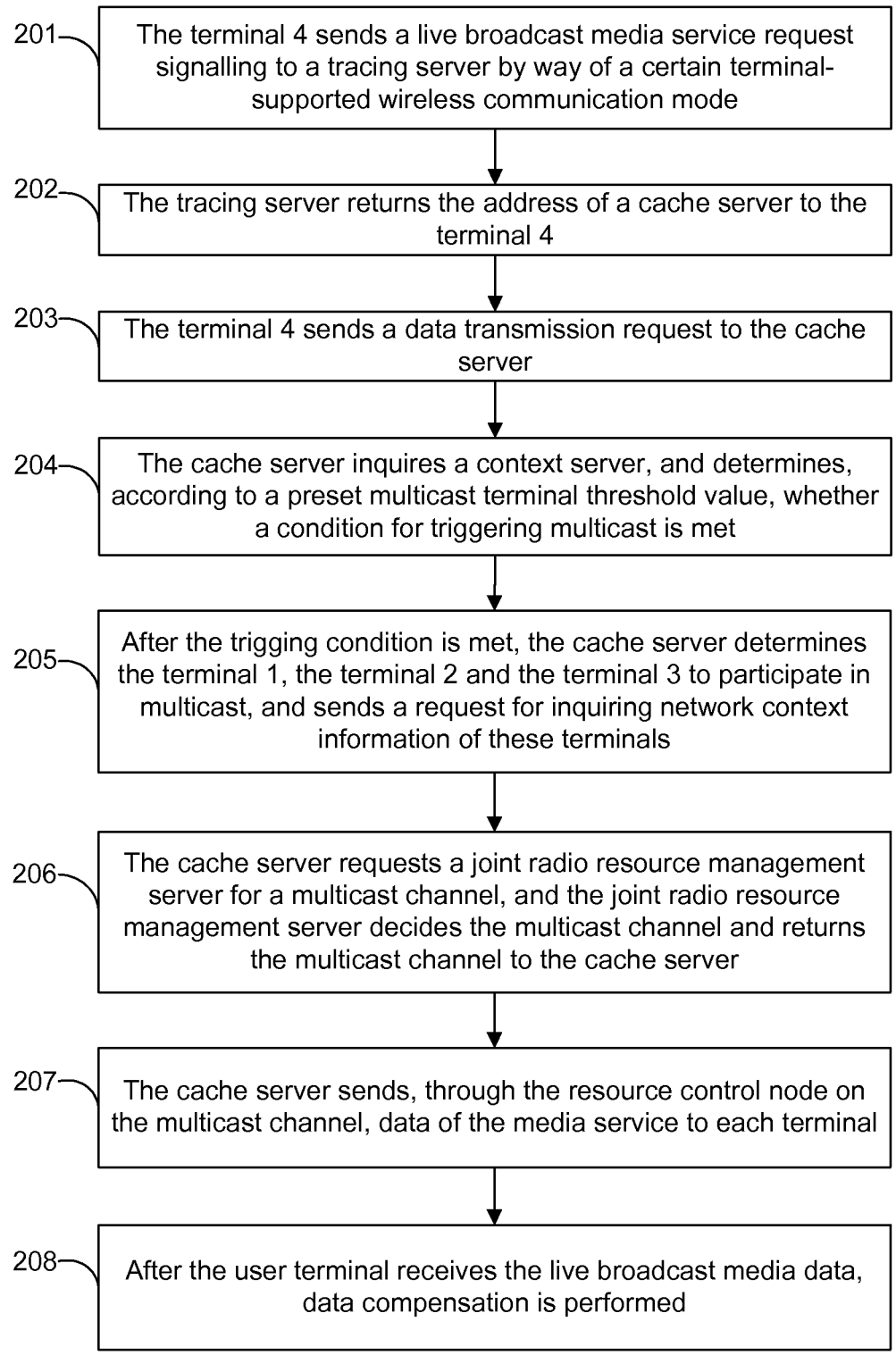
FIG. 2 is a flowchart of an embodiment of downloading a live broadcast media service in a ubiquitous network by means of multicast according to the disclosure.

FIG. 2 is a flowchart of an embodiment of downloading a live broadcast media service in a ubiquitous network by means of multicast according to the disclosure. As shown in FIG. 2, it is assumed in the embodiment that a user terminal requesting for a live broadcast media service is terminal 4 and terminals found in the surrounding environment of the user terminal are terminal 1, terminal 2, terminal 3 and terminal 5. Each user terminal is a multi-mode terminal, and may be connected to multiple kinds of networks simultaneously. The flow includes:

Step 201: The terminal 4 sends a live broadcast media service request signalling to a tracing server by way of a certain terminal-supported wireless communication mode.

Specifically, the live broadcast media service request signalling includes signalling the type of a media service required to be downloaded, and a download signalling.

Step 202: The tracing server returns the address of a cache server to the terminal 4.

Specifically, the tracing server receives the live broadcast media service request signalling sent by the user terminal, performs parsing processing, identifies the service type of the requested service and the download signalling, performs, according to the service type, an internal query for a media service matched with the service type in a preset service engine, determines, according to the found media service, the address of the cache server storing the media service, and further transmits, by way of a signalling, the address of the cache server to the user terminal requesting for the media service, i.e., the terminal 4.

Step 203: The terminal 4 sends a data transmission request to the cache server.

Specifically, the user terminal requesting for the media service sends, by way of a certain wireless communication mode according to the acquired address of the cache server, a data transmission request signalling to the cache server.

Step 204: The cache server inquires a context server, and determines, according to a preset multicast terminal threshold value, whether a condition for triggering multicast is met.

Specifically, the cache server sends, by way of event triggering, a multicast condition inquiry signalling to the context server to determine and find out the condition for triggering multicast. Further, working conditions of the terminals surrounding the user terminal in the context server are inquired, wherein it is found that the terminal 1, the terminal 2, the terminal 3 and the terminal 5 surrounding the user terminal are requesting for or performing the same live broadcast media service. The terminal 1, the terminal 2 and the terminal 3 adopt one of the wireless network modes supported by the terminal 4 while the terminal 5 adopts another of the wireless network modes supported by the terminal 4. Comparing the multicast terminal threshold value preset in the context server, the threshold value is a comprehensive evaluation index for related factors including the number of terminals participating in multicast, the multicast service transmission progress and the quality of the multicast channel. Through determining, the terminal 1, the terminal 2, the terminal 3 and the terminal 4 may form a multicast group, which meets the condition for trigging multicast.

Step 205: After the triggering condition is met, the cache server determines the terminal 1, the terminal 2 and the terminal 3 to participate in multicast, and sends a request for inquiring network context information of these terminals.

Specifically, the context server stores a corresponding relation table of a resource control node and each terminal, receives the inquiry request of the cache server and feeds back information in the table to the cache server. The corresponding relation table of the resource control node and each terminal includes all available channels and parameter information of the channels for each terminal to access the resource control point.

Step 206: The cache server requests a joint radio resource management server for a multicast channel, and the joint radio resource management server decides the multicast channel and returns the multicast channel to the cache server.

Specifically, the cache server sends a multicast channel decision request signalling to the joint radio resource management server to request decision of the multicast channel. Further, the signalling further includes the terminals determined in Step 204, and network context information including resource control node channel information, and network load conditions and network signal strength corresponding to the terminals.

The joint radio resource management server decides the multicast channel according to the network context information including the conditions of radio resources used by loads and the network signal strength, and a corresponding relationship of the terminals and the resource control node information. The joint resource management server decides the multicast channel, and transmits the multicast channel to the cache server by way of signalling.

Step 207: The cache server sends, through the resource control node on the multicast channel, data of the media service to each terminal.

Specifically, the cache server receives the multicast channel, and transmits, through a certain protocol data format, the requested media service data to the resource control node by way of event triggering; and the resource control node receives the media service data, and distributes live broadcast media data to the terminals 1, 2, 3 and 4 through the multicast channel.

Further, the embodiment optionally includes: Step 208: after the user terminal receives the live broadcast media data, data compensation is performed.

Specifically, after receiving the live broadcast media data, the terminal 4 detects the integrity of the received data simultaneously through a built-in detection software packet. If packet loss is verified, the terminal 4 sends a compensation signalling to the cache server through one of other terminal-supported communication modes. After receiving the request for compensating packet loss data, the cache server performs the packet loss compensation, or the terminal 4 sends the compensation signalling to surrounding terminals, so as to perform the packet loss compensation.

Specifically, before the terminal 4 joins the multicast group, service flows downloaded by other members of the multicast group may be compensated by one or cooperation of several of the following manners:

(1) after a multicast service is started, service breakpoint information is acquired; a request with a message including the service breakpoint information is send to the tracing server through an interface of a network in which a non-multicast service is located; the tracing server cooperates with the context server, the cache server and the joint radio resource management server to transmit service data earlier than a breakpoint of a resource access point to the terminal side through another interface of the user terminal, and finally synthesizes the service data with a service after later than the breakpoint; and (2) after the multicast service is ended, the user terminal checks service integrity, reports, to the cache server, service information which cannot be acquired before multicast, finds out, by using the context server, around the user terminal a resource access point and a terminal that may provide a corresponding service, and service compensation is performed through multiple interfaces of the user terminal.

The user terminal in the above embodiment is a multi-mode terminal. The terminal may access multiple networks simultaneously. Besides downloading a media service by the above manner, the data compensation may be performed for packet loss and other conditions through other networks by using the advantage of multiple modes, which is distinctly different from conventional IP multicast.

Figure 3:
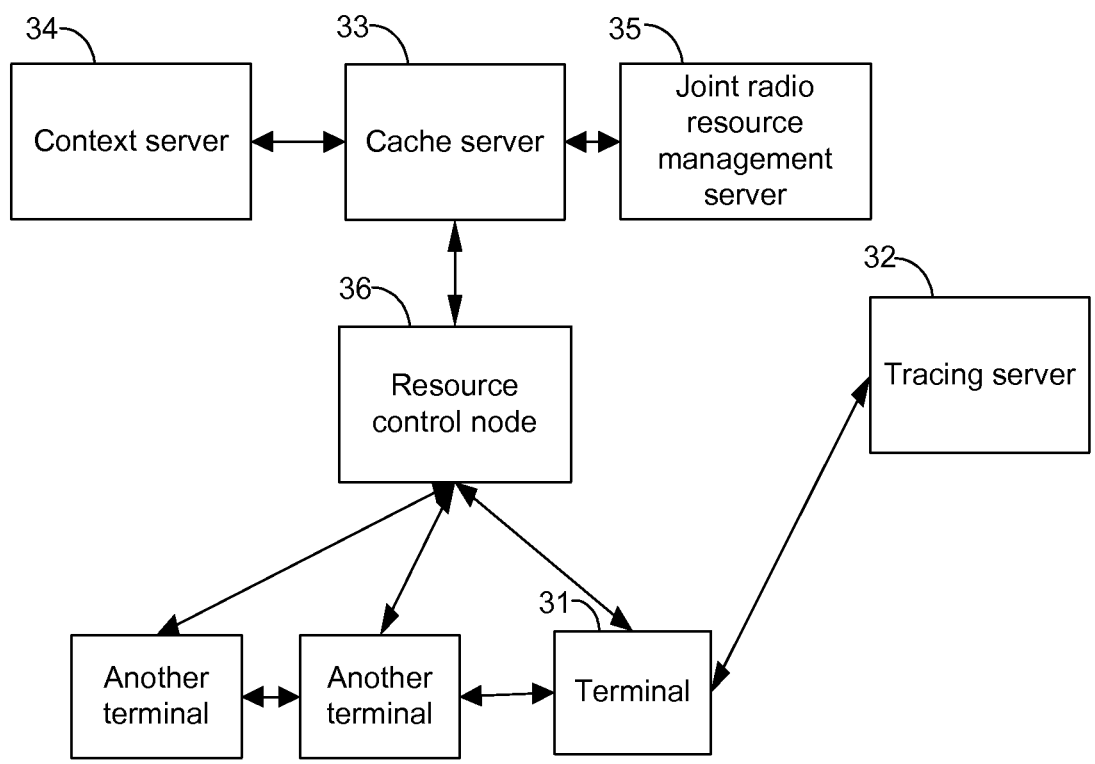
FIG. 3 is a structural diagram of a system for downloading in a ubiquitous network by means of multicast according to the disclosure.

FIG. 3 is a structural diagram of a system for downloading in a ubiquitous network by means of multicast according to the disclosure. As shown in FIG. 3, the system includes: a terminal 31, a tracing server 32, a cache server 33, a context server 34, a joint radio resource management server 35 and a resource control node 36.

The terminal 31 is configured to: after requesting to download a media service, acquire, from the tracing server 32, an address of the cache server 33 corresponding to the media service, and request the cache server 33 to transmit the media service.

Specifically, the process that the terminal 31 acquires from the tracing server 32 the address of the cache server 33 corresponding to the media service after requesting to download the media service includes: the terminal 31 sends, to the tracing server 32, a request for downloading the media service; after receiving the request, the tracing server 32 identifies, from the request, a service type of the media service requested to be downloaded and a signalling for downloading the media service, and performs, according to the service type, an internal query for the address of the cache server 33 corresponding to the media service from a preset service engine, and returns the address of the cache server 33 to the terminal 31 requesting to download the media service. The process that the terminal 31 requests the cache server 33 to transmit the media service includes: the terminal 31 sends in a wireless communication a request for transmitting the media service, to the cache server 33 according to the address of the cache server 33.

The cache server 33 is configured to: after receiving the request, trigger the context server 34 to determine, according to a preset multicast terminal threshold value, whether a condition for triggering multicast is met; when the condition for triggering multicast is met, cooperate with the context server 34 and the joint radio resource management server 35 to determine a plurality of terminals participating in multicast and a multicast channel; and sends the data of the media service to each terminal on the multicast channel via the resource control node 36.

Specifically, wherein the process that the cache server 33 triggers the context server 34 to determine, according to a preset multicast terminal threshold value, whether the condition for triggering multicast is met includes: after receiving the request, the cache server 33 sends a signalling for inquiring a multicast condition to the context server 34, and then determines, according to working conditions of surrounding terminals of the terminal returned by the context server 34 and the preset multicast terminal threshold value, whether the condition for triggering multicast is met. The preset multicast terminal threshold value includes: a preset index comprehensively evaluated according to the number of terminals participating in multicast, multicast service transmission progress and quality of the multicast channel.

The process that the cache server 33 cooperates with the context server 34 and the joint radio resource management server 35 to determine the plurality of terminals and the multicast channel when the condition for triggering multicast is met includes: when the condition for triggering multicast is met, the cache server 33 determines, according to the multicast terminal threshold value, the plurality of terminals participating in multicast from surrounding terminals of the terminal, acquires, from the context server 34, network context information of the plurality of terminals participating in multicast; and the joint radio resource management server 35 determines the multicast channel according to the network context information sent by the cache server 33, and sends the multicast channel to the cache server 33. Wherein, the network context information includes: resource control node information corresponding to the plurality of terminals participating in multicast, network load conditions and network signal strength.

Further, the terminal 31 is further configured to: when the data of the media service received by the terminal 31 are incomplete, acquire data compensation from the cache server 33 or another terminal which has received the multicast media service.

Specifically, the terminal 31 includes a single-mode terminal and/or a multi-mode terminal. When the terminal 31 is the multi-mode terminal, the process that the terminal acquires the data compensation from the cache server 33 or another terminal which has received the multicast media service when the data of the media service received by the terminal are incomplete includes: after the multicast media service is started or the multicast media service is ended, the terminal 31 acquires, by using multiple network modes supported by the terminal 31, the data compensation from the cache server 33 or another terminal which has received the multicast media service.

Further, for example, after the multicast service is started, the terminal 31 initiates, according to acquired breakpoint information of the media service, the request to the tracing server 32 through another network mode occupied by a non-multicast service. The tracing server 32 cooperates with the context server 34, the joint radio resource management server 35 and the cache server 33 to send media service data earlier than the breakpoint information to the terminal 31, and combines the media service data earlier than the breakpoint information with media service data later than the breakpoint information to achieve data compensation. Alternatively, after the multicast service is ended, the terminal 31 checks service integrity, reports lost media service data to the cache server 33, and the cache server 33 inquires, by using the context server 34, a surrounding terminal capable of providing the lost media service data, so that the terminal 31 acquires the data compensation through multiple network modes supported by the terminal 31.

The above are only preferred embodiments of the disclosure, and are not intended to limit the scope of protection of the claims of the disclosure.

The invention claimed is:

1. A method for downloading in a ubiquitous network by multicast, comprising:
   after requesting to download a media service, acquiring, by a terminal from a tracing server, an address of a cache server corresponding to the media service, and requesting the cache server to transmit the media service;
   after receiving the request, triggering, by the cache server, a context server to determine, according to a preset multicast terminal threshold value, whether a condition for triggering multicast is met;
   when the condition for triggering multicast is met, cooperating, by the cache server, with the context server and a joint radio resource management server to determine a plurality of terminals participating in multicast and a multicast channel; and
   sending, by the cache server, data of the media service to each terminal on the multicast channel via a resource control node, wherein the triggering of the context server to determine, according to the preset multicast terminal threshold value, whether the condition for triggering multicast is met comprises:
  after receiving the request, sending, by the cache server, a signalling for inquiring a multicast condition to the context server, and
  determining, according to working conditions of surrounding terminals of the terminal returned by the context server and the preset multicast terminal threshold value, whether the condition for triggering multicast is met,
wherein the preset multicast terminal threshold value comprises:
  a preset index evaluated according to the number of terminals participating in multicast, multicast service transmission progress and quality of the multicast channel.

2. The method according to claim 1, further comprising:
after the data of the media service are sent to each terminal,
  when the data of the media service received by the terminal are incomplete, acquiring, by the terminal, data compensation from the cache server or another terminal which has received the multicast media service.

3. The method according to claim 2, wherein the terminal comprises a single-mode terminal and/or a multi-mode terminal; and
  when the terminal is the multi-mode terminal, the acquiring, by the terminal, data compensation from the cache server or another terminal which has received the multicast media service when the data of the media service received by the terminal are incomplete comprises:
  after the multicast media service is started or the multicast media service is ended, acquiring, by the terminal using multiple network modes supported by the terminal, the data compensation from the cache server or another terminal which has received the multicast media service.

4. The method according to claim 2, wherein the acquiring, by a terminal, from a tracing server an address of a cache server corresponding to the media service and requesting the cache server to transmit the media service after requesting to download a media service comprises:
  sending, by the terminal, a request for downloading the media service, to the tracing server;
  after receiving the request, identifying, by the tracing server from the request, a service type of the media service requested to be downloaded and a signalling for downloading the media service, and performing, according to the service type, an internal query for the address of the cache server corresponding to the media service in a preset service engine, and returning the address of the cache server to the terminal requesting to download the media service; and
  sending in a wireless communication, by the terminal, a request for transmitting the media service, to the cache server according to the address of the cache server.

5. The method according to claim 2, wherein the cooperating, by the cache server, with the context server and a joint radio resource management server to determine a plurality of terminals participating in multicast and a multicast channel when the condition for triggering multicast is met comprises:
  when the condition for triggering multicast is met, determining, by the cache server according to the multicast terminal threshold value, the plurality of terminals participating in multicast from surrounding terminals of the terminal, acquiring, from the context server, network context information of the plurality of terminals participating in multicast; and
  determining, by the joint radio resource management server according to the network context information sent from the cache server, the multicast channel, and sending the multicast channel to the cache server,
wherein the network context information comprises: resource control node information corresponding to the plurality of terminals participating in multicast, network load conditions and network signal strength.

6. The method according to claim 1, wherein the acquiring, by a terminal, from a tracing server an address of a cache server corresponding to the media service and requesting the cache server to transmit the media service after requesting to download a media service comprises:
  sending, by the terminal, a request for downloading the media service, to the tracing server;
  after receiving the request, identifying, by the tracing server from the request, a service type of the media service requested to be downloaded and a signalling for downloading the media service, and performing, according to the service type, an internal query for the address of the cache server corresponding to the media service in a preset service engine, and returning the address of the cache server to the terminal requesting to download the media service; and
  sending in a wireless communication, by the terminal, a request for transmitting the media service, to the cache server according to the address of the cache server.

7. The method according to claim 1, wherein the cooperating, by the cache server, with the context server and a joint radio resource management server to determine a plurality of terminals participating in multicast and a multicast channel when the condition for triggering multicast is met comprises:
  when the condition for triggering multicast is met, determining, by the cache server according to the multicast terminal threshold value, the plurality of terminals participating in multicast from surrounding terminals of the terminal, acquiring, from the context server, network context information of the plurality of terminals participating in multicast; and
  determining, by the joint radio resource management server according to the network context information sent from the cache server, the multicast channel, and sending the multicast channel to the cache server,
wherein the network context information comprises: resource control node information corresponding to the plurality of terminals participating in multicast, network load conditions and network signal strength.

8. A system for downloading in a ubiquitous network multicast, comprising:
  a terminal, a tracing server, a cache server, a context server, a joint radio resource management server and a resource control node,
  wherein the terminal is configured to:
  after requesting to download a media service, acquire, from the tracing server, an address of the cache server corresponding to the media service, and request the cache server to transmit the media service;
  wherein the cache server is configured to:
  after receiving the request, trigger the context server to determine, according to a preset multicast terminal threshold value, whether a condition for triggering multicast is met; when the condition for triggering multicast is met, cooperate with the context server and the joint radio resource management server to determine a plurality of terminals participating in multicast and a multicast channel; and send data of the media service to each terminal on the multicast channel via the resource control node, wherein the cache server is further configured to, after receiving the request, send a signalling for inquiring a multicast condition to the context server, and determine, according to working conditions of surrounding terminals of the terminal returned by the context server and the preset multicast terminal threshold value, whether the condition for triggering multicast is met, and wherein the preset multicast terminal threshold value comprises:

a preset index evaluated according to the number of terminals participating in multicast, multicast service transmission progress and quality of the multicast channel.

9. The system according to claim 8, wherein the terminal is further configured to, when the data of the media service received by the terminal are incomplete, acquire data compensation from the cache server or another terminal which has received the multicast media service.

10. The system according to claim 9, wherein the terminal comprises a single-mode terminal and/or a multi-mode terminal; and when the terminal is the multi-mode terminal, the process that the terminal acquires data compensation from the cache server or another terminal which has received the multicast media service when the data of the media service received by the terminal are incomplete comprises:

after the multicast media service is started or the multicast media service is ended, the terminal acquires, using multiple network modes supported by the terminal, the data compensation from the cache server or another terminal which has received the multicast media service.

11. The system according to claim 9, wherein the process that a terminal acquires from a tracing server an address of a cache server corresponding to the media service and requests the cache server to transmit the media service after requesting to download a media service comprises:

the terminal sends, to the tracing server, a request for downloading the media service;

after receiving the request, the tracing server identifies, from the request, a service type of the media service requested to be downloaded and a signalling for downloading the media service, and performs, according to the service type, an internal query for the address of the cache server corresponding to the media service in a preset service engine, and returns the address of the cache server to the terminal requesting to download the media service; and the terminal sends in a wireless communication a request for transmitting the media service, to the cache server according to the address of the cache server.

12. The system according to claim 9, wherein the process that the cache server cooperates with the context server and a joint radio resource management server to determine a plurality of terminals participating in multicast and a multicast channel when the condition for triggering multicast is met comprises:

when the condition for triggering multicast is met, the cache server determines, according to the multicast terminal threshold value, the plurality of terminals participating in multicast from surrounding terminals of the terminal, acquires, from the context server, network context information of the plurality of terminals participating in multicast; and the joint radio resource management server determines the multicast channel according to the network context information sent from the cache server, and sends the multicast channel to the cache server, wherein the network context information comprises: resource control node information corresponding to the plurality of terminals participating in multicast, network load conditions and network signal strength.

13. The system according to claim 8, wherein the process that a terminal acquires from a tracing server an address of a cache server corresponding to the media service and requests the cache server to transmit the media service after requesting to download a media service comprises:

the terminal sends, to the tracing server, a request for downloading the media service;

after receiving the request, the tracing server identifies, from the request, a service type of the media service requested to be downloaded and a signalling for downloading the media service, and performs, according to the service type, an internal query for the address of the cache server corresponding to the media service in a preset service engine, and returns the address of the cache server to the terminal requesting to download the media service; and the terminal sends in a wireless communication a request for transmitting the media service, to the cache server according to the address of the cache server.

14. The system according to claim 8, wherein the process that the cache server cooperates with the context server and a joint radio resource management server to determine a plurality of terminals participating in multicast and a multicast channel when the condition for triggering multicast is met comprises:

when the condition for triggering multicast is met, the cache server determines, according to the multicast terminal threshold value, the plurality of terminals participating in multicast from surrounding terminals of the terminal, acquires, from the context server, network context information of the plurality of terminals participating in multicast; and the joint radio resource management server determines the multicast channel according to the network context information sent from the cache server, and sends the multicast channel to the cache server, wherein the network context information comprises: resource control node information corresponding to the plurality of terminals participating in multicast, network load conditions and network signal strength.

* * * * *